United States Patent
Chang

(10) Patent No.: US 12,522,238 B2
(45) Date of Patent: Jan. 13, 2026

(54) VEHICLE AND METHOD OF CONTROLLING THE SAME

(71) Applicants: Hyundai Motor Company, Seoul (KR); Kia Corporation, Seoul (KR)

(72) Inventor: Kyoung-Jin Chang, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 257 days.

(21) Appl. No.: 17/981,291

(22) Filed: Nov. 4, 2022

(65) Prior Publication Data

US 2023/0166756 A1 Jun. 1, 2023

(30) Foreign Application Priority Data

Nov. 26, 2021 (KR) ........................ 10-2021-0166061

(51) Int. Cl.
 *B60W 50/16* (2020.01)
 *B60W 10/08* (2006.01)
 *B60W 30/08* (2012.01)

(52) U.S. Cl.
 CPC ............ *B60W 50/16* (2013.01); *B60W 10/08* (2013.01); *B60W 30/08* (2013.01); *B60W 2540/10* (2013.01); *B60W 2710/081* (2013.01)

(58) Field of Classification Search
 CPC ........... B60W 50/16; B60W 2710/081; B60W 2540/10; B60W 30/08; B60W 10/08
 See application file for complete search history.

(56) References Cited

U.S. PATENT DOCUMENTS

| | | | | |
|---|---|---|---|---|
| 9,845,093 | B2* | 12/2017 | Yamashita | B60W 30/18163 |
| 10,421,465 | B1* | 9/2019 | Jutkowitz | B60W 10/184 |
| 11,787,430 | B2* | 10/2023 | Kim | B60W 50/12 |
| | | | | 701/45 |
| 12,017,647 | B2* | 6/2024 | Baek | B60W 30/09 |
| 2012/0212353 | A1* | 8/2012 | Fung | G08G 1/167 |
| | | | | 701/1 |
| 2016/0187880 | A1* | 6/2016 | Chen | B60W 30/12 |
| | | | | 701/27 |
| 2016/0339913 | A1* | 11/2016 | Yamashita | B60W 30/18163 |
| 2018/0299890 | A1* | 10/2018 | Ewert | B60W 50/14 |
| 2019/0375402 | A1* | 12/2019 | Shimizu | B60W 10/04 |
| 2020/0079287 | A1* | 3/2020 | Wolf | B60Q 9/00 |
| 2021/0309240 | A1* | 10/2021 | Kim | B60W 50/10 |
| 2022/0203891 | A1* | 6/2022 | Hong | B60Q 9/008 |
| 2022/0283773 | A1* | 9/2022 | Chang | G06V 10/761 |

(Continued)

FOREIGN PATENT DOCUMENTS

| KR | 10-2006-0012550 A | 2/2006 |
|---|---|---|
| KR | 10-2012-0032383 A | 4/2012 |

(Continued)

*Primary Examiner* — Peter D Nolan
*Assistant Examiner* — Wae L Louie
(74) *Attorney, Agent, or Firm* — Morgan Lewis & Bockius LLP

(57) ABSTRACT

A vehicle includes a driving motor; a driver electrically connected to the driving motor; and a controller electrically connected to the driver; wherein the controller is configured to control the driver to supply a driving current in which a first driving current for controlling a driving speed of the vehicle and a second driving current for generating vibration in the vehicle are overlapped, to the driving motor.

20 Claims, 6 Drawing Sheets

(56) References Cited

U.S. PATENT DOCUMENTS

| | | | |
|---|---|---|---|
| 2022/0410972 A1* | 12/2022 | Chang | B62D 15/029 |
| 2023/0080993 A1* | 3/2023 | Kim | G06F 3/016 |
| | | | 701/23 |
| 2023/0166756 A1* | 6/2023 | Chang | B60L 15/025 |
| | | | 701/36 |

FOREIGN PATENT DOCUMENTS

| | | |
|---|---|---|
| KR | 10-2013-0065134 A | 6/2013 |
| KR | 10-2018-0001094 A | 1/2018 |
| KR | 10-2182098 B1 | 12/2020 |

* cited by examiner

VEHICLE AND METHOD OF CONTROLLING THE SAME

CROSS-REFERENCE TO RELATED APPLICATION(S)

The present application claims priority to Korean Patent Application No. 10-2021-0166061, filed on Nov. 26, 2021, the entire contents of which is incorporated herein for all purposes by this reference.

BACKGROUND OF THE PRESENT DISCLOSURE

Field of the Present Disclosure

The present disclosure relates to a vehicle and a control method thereof, and more particularly, to a vehicle including a driving motor configured for driving the vehicle and a method of controlling the same.

Description of Related Art

In general, a vehicle is a carrying means or a transporting means that runs on a road or a track using fossil fuels, electricity, etc. as a power source.

To provide convenience and safety to a driver, vehicles collect environmental information around the vehicle, and also warns the driver of a danger based on the collected information. For example, if a collision with a vehicle traveling ahead is expected, a vehicle may warn the driver of a forward collision.

Furthermore, vehicles may provide warnings to a driver in a variety of ways, such as visual, auditory, and tactile, and the like. For example, vehicles may provide a warning to a driver by generating vibrations in a steering wheel or a seat.

However, warning through the steering wheel or seat requires a separate device (e.g., motor, solenoid, piezo element, etc.) for generating vibration. As a result, the weight of the vehicle may increase, and energy efficiency (or fuel efficiency) of the vehicle may decrease.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for generating vibration using a driving motor configured for driving the vehicle without a separate device configured for generating vibration, and a method for controlling the same.

Additional aspects of the present disclosure will be set forth in part in the description which follows, and in part, will be obvious from the description, or may be learned by practice of the present disclosure.

In accordance with an aspect of the present disclosure, a vehicle includes a driving motor; a driver electrically connected to the driving motor; and a controller electrically connected to the driver; wherein the controller is configured to control the driver to supply a driving current in which a first driving current for controlling a driving speed of the vehicle and a second driving current for generating vibration in the vehicle are overlapped, to the driving motor.

The vehicle may further include an accelerator pedal sensor, wherein the controller is further configured to control the driver to supply the first driving current to the driving motor based on an acceleration signal received from the accelerator pedal sensor.

The controller may be further configured to control the driver to supply the first driving current to the driving motor so that a rotation speed of the driving motor follows a target rotation speed based on the acceleration signal.

The vehicle may further include a driving assistance device, wherein the controller is further configured to control the driver to supply the second driving current to the driving motor based on a warning signal received from the driving assistance device.

The controller may be further configured to control the driver to supply different second driving currents to the driving motor so that the vehicle vibrates in different patterns based on different warning signals received from the driving assistance device.

The controller may be further configured to control the driver to supply different second driving currents to the driving motor so that the vehicle vibrates with different amplitudes based on different warning signals received from the driving assistance device.

The controller may be further configured to control the driver to supply different second driving currents to the driving motor so that the vehicle vibrates at different frequencies based on different warning signals received from the driving assistance device.

The driving assistance device may be configured to provide a warning signal for warning of a collision of the vehicle to the controller.

The driving assistance device may be configured to provide a warning signal for waking a driver to the controller.

The controller may be further configured to control the driver to supply the driving current based on a q-axis current command for controlling a rotation speed of the driving motor and a d-axis current command for changing the rotation speed of the driving motor, to the driving motor.

In accordance with another aspect of the present disclosure, a method for controlling a vehicle including a driving motor includes obtaining driving information of the vehicle; obtaining environmental information around the vehicle; and supplying a driving current in which a first driving current for controlling a driving speed of the vehicle based on the driving information and a second driving current for generating vibration in the vehicle based on the environmental information around the vehicle, to the driving motor.

Obtaining the driving information of the vehicle may further include obtaining, by an accelerator pedal sensor of the vehicle, an acceleration signal including a movement displacement and a movement speed of the accelerator pedal.

Supplying the driving current to the driving motor may further include controlling the first driving current so that a rotation speed of the driving motor follows a target rotation speed based on the acceleration signal.

Obtaining the environmental information around the vehicle may further include obtaining, by a driving assistance device of the vehicle, information on an object around the vehicle, and obtaining a warning signal based on the information on the object.

Supplying the driving current to the driving motor may further include supplying different second driving currents to the driving motor so that the vehicle vibrates in different patterns based on different warning signals.

Supplying the driving current to the driving motor may further include supplying different second driving currents to the driving motor so that the vehicle vibrates with different amplitudes based on different warning signals.

Supplying the driving current to the driving motor may further include supplying different second driving currents to the driving motor so that the vehicle vibrates at different frequencies based on different warning signals.

Obtaining the environmental information around the vehicle may include obtaining a warning signal for warning of a collision of the vehicle.

Obtaining the environmental information around the vehicle may include obtaining a warning signal for waking up a driver.

Supplying the driving current to the driving motor may further include supplying the driving current to the driving motor based on a q-axis current command for controlling a rotation speed of the driving motor and a d-axis current command for changing the rotation speed of the driving motor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
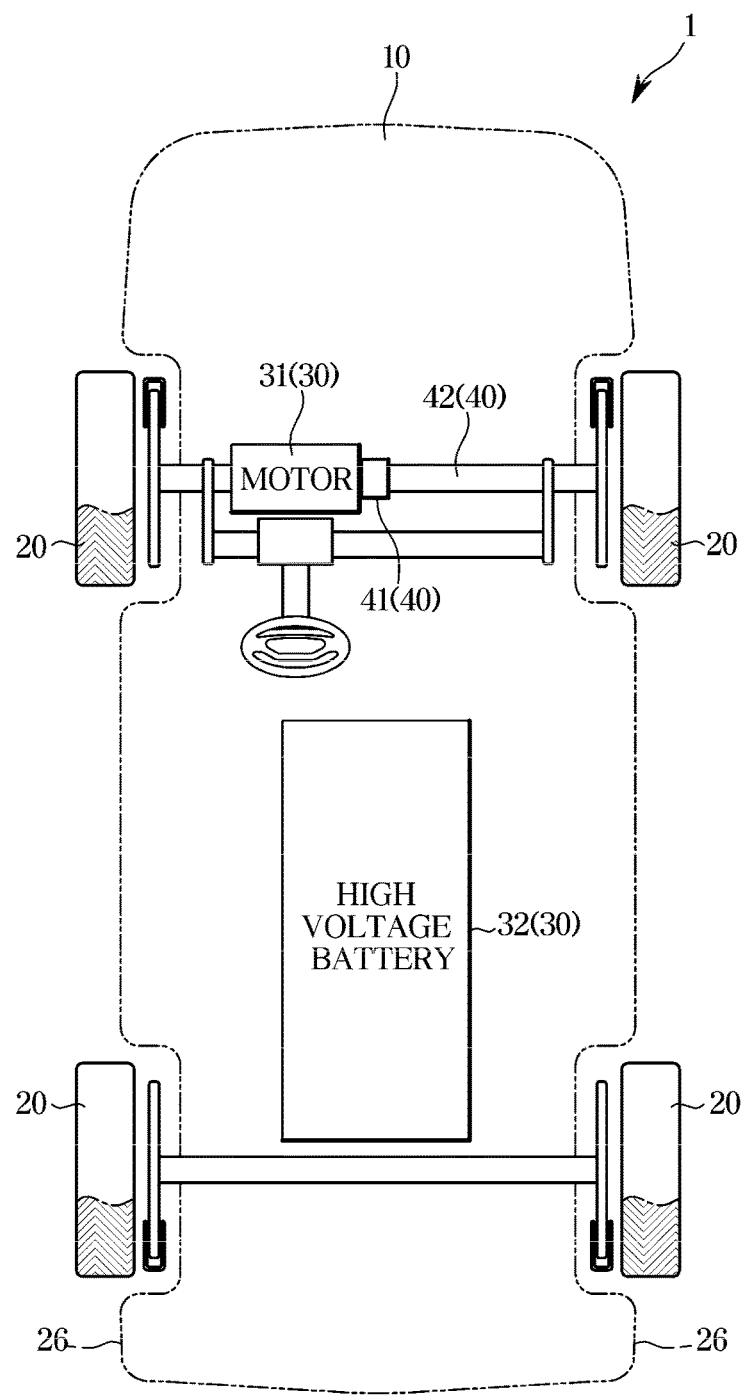
FIG. 1 schematically shows a structure of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings, wherein like reference numerals refer to like elements throughout. This specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, various embodiments of the present disclosure will be described in detail with reference to the accompanying drawings.

FIG. 1 schematically shows a structure of a vehicle according to an exemplary embodiment of the present disclosure.

A vehicle 1 may include a vehicle body for accommodating a driver and/or a luggage, and a chassis including a power generating device, a power transmitting device, a braking device, a steering device, etc. except for the vehicle body.

Referring to FIG. 1, the chassis of the vehicle 1 may include a frame 10, a wheel 20, a power generating device 30, and a power transmitting device 40.

The power generating device 30 generates a rotation force for driving the vehicle 1, and may include a driving motor 31, a battery 32, and the like. The battery 32 may store electrical energy, and the driving motor 31 may generate power (e.g., rotation force, torque) for driving the vehicle 1 using the electrical energy stored in the battery 32.

The power transmitting device 40 transmits the rotation force generated by the power generating device 30 to the wheel 20, and may include a reducer 41, a shaft 42, and the like. The reducer 41 may reduce rotation of the driving motor 31 and transmit the reduced torque to the shaft 42. Opposite end portions of the shaft 42 are provided on the wheel 20, and torque of the shaft 42 may be transmitted to the wheel 20.

The wheel 20 may receive the power generated by the power generating device 30 through the power transmitting device 40, and move the vehicle 1. The wheel 20 may include a front wheel disposed at the front of the vehicle 1 and a rear wheel disposed at the rear of the vehicle 1.

The frame 10 may fix the wheel 20 and support the power generating device 30 and the power transmitting device 40.

Although FIG. 1 shows a vehicle including the driving motor 31 and the battery 32, that is, an electric vehicle, the vehicle according to an exemplary embodiment of the present disclosure is not limited to the electric vehicle. For example, the vehicle includes a driving motor and an engine, and may include a hybrid vehicle driven by the driving motor or the engine.

Figure 2:
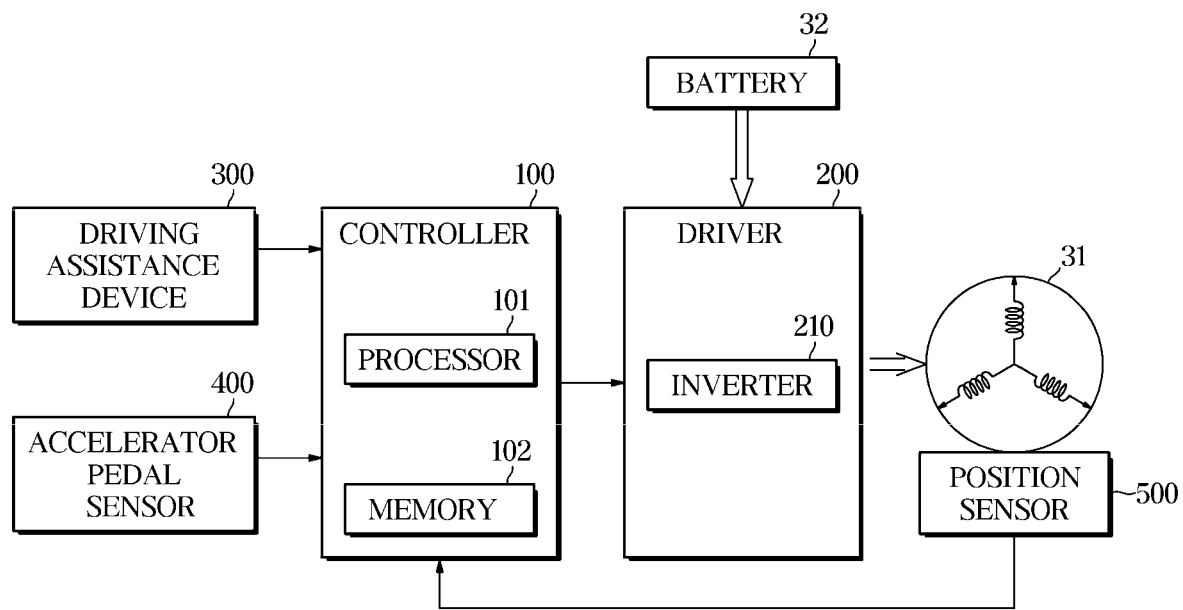
FIG. 2 shows an electrical configuration of a vehicle according to an exemplary embodiment of the present disclosure.

FIG. 2 shows an electrical configuration of a vehicle according to an exemplary embodiment of the present disclosure.

The vehicle 1 may include various electrical circuits and/or electrical configurations for controlling the driving motor 31 that drives the vehicle 1.

Referring to FIG. 2, the vehicle 1 may include a driving assistance device 300, an accelerator pedal sensor 400, the battery 32, a driver 200, the driving motor 31, a position sensor 500, and/or the controller 100.

The driving assistance device 300 may be electrically or operatively connected to the controller 100. For example, the driving assistance device 300 may be connected to the controller 100 via a hard wire or may be connected to the controller 100 via a communication network.

The driving assistance device 300 may include various sensors configured for collecting environmental information around the vehicle 1. For example, the driving assistance device 300 may include a camera, a radar sensor, and/or a light detection and ranging (LiDAR) sensor.

The driving assistance device 300 may identify various objects positioned around the vehicle 1. For example, the driving assistance device 300 may identify other vehicles around the vehicle 1, pedestrians around the vehicle 1, and/or stationary objects that interfere with the operation of the vehicle 1.

The driving assistance device 300 may obtain information on objects around the vehicle 1. For example, the driving assistance apparatus 300 may obtain relative positions (e.g., a distance and an angle) and/or relative speeds of objects around the vehicle 1.

The driving assistance device 300 may identify whether a possibility of collision between objects around the vehicle 1 and the vehicle 1 exists, and in response that the collision within a predetermined time period is expected, provide a warning signal to warn a driver of the collision to the controller 100.

Furthermore, the driving assistance device 300 may collect information regarding a driver's state (e.g., not holding the steering wheel or drowsy driving, etc.). The driving assistance device 300 may provide the warning signal to the controller 100 to provide a warning to awaken the driver based on the driver's state.

The accelerator pedal sensor 400 may be operatively connected to an accelerator pedal of the vehicle 1 and may detect a movement of the accelerator pedal from a reference position thereof. The driver may move the accelerator pedal from a reference position to accelerate a driving speed of the vehicle 1.

The accelerator pedal sensor 400 may detect a movement displacement of the accelerator pedal by the driver, and may identify a movement speed of the accelerator pedal.

The accelerator pedal sensor 400 may be electrically connected to the controller 100. For example, the accelerator pedal sensor 400 may be connected to the controller 100 through the hard wire. The accelerator pedal sensor 400 may provide an accelerator signal including the movement displacement of the accelerator pedal and/or the movement speed of the accelerator pedal to the controller 100 through connection with the controller 100.

The battery 32 may store electrical energy and supply direct current (DC) power to electrical devices mounted on the vehicle 1. The battery 32 may supply the DC power not only to the driving motor 31, but also to the driving assistance device 300, the accelerator pedal sensor 400, the controller 100, and/or the driver 200.

The battery 32 may output high voltage power to supply a large amount of power to the driving motor 31. For example, the battery 32 may output power of a voltage ranging from 600V to 800V or higher. Power of a voltage dropped from the output voltage of the battery 32 may be supplied to the driving assistance device 300, the accelerator pedal sensor 400, the controller 100, and/or the driver 200.

The driver 200 may convert the DC power of the battery 32 into alternating current (AC) power, and supply the converted the AC power to the driving motor 31. In other words, the driver 200 may convert and control the power supplied from the battery 32 to the driving motor 31.

The driver 200 may include an inverter 210 for converting DC power into AC power. The inverter 210 may include a plurality of switch elements for controlling the current flowing through the driving motor 31. The plurality of switch elements included in the inverter 210 may convert the DC power of the battery 32 into the AC power according to a control signal of the controller 100.

The driving motor 31 may receive the AC power converted by the driver 200 and convert the AC power into torque (rotation or rotation force).

The driving motor 31 may include a stator fixed to the vehicle 1 and a rotor rotatably provided to the stator. The rotor may rotate by magnetic interaction between the stator and the rotor.

For example, the rotor may include permanent magnets and the stator may include coils. The AC power converted by the driver 200 may be supplied to the coils of the stator, and a time-varying AC magnetic field may be generated around the coils. The magnetic interaction between the changing magnetic field of the coils and the magnetic field of the permanent magnets may cause the rotor to rotate.

As an exemplary embodiment of the present disclosure, the rotor may include a magnetic body and the stator may include a coil. A time-varying AC magnetic field may be generated around the coil by AC power. The magnetic body may be magnetized by the AC magnetic field of the coil, and the rotor may be rotated by the magnetic interaction between the magnetic field of the magnetized magnetic body and the changing magnetic field of the coil.

The driving motor 31 may be a three-phase motor including three terminals and three coils. The three terminals and the three coils may be connected by various wiring methods.

For example, the three coils may be connected by a star connection (or a Y connection) in which one end of the three coils is connected at one node. As an exemplary embodiment of the present disclosure, the three coils may be connected by a delta connection in which opposite ends of each of the three coils are connected to different coils. The three-phase terminals of the driving motor 31 may include an A-phase terminal, a B-phase terminal, and a C-phase terminal.

The position sensor 500 may be operatively connected to the driving motor 31, and measure a position θ (e.g., an electric angle of the rotor) of the rotor of the driving motor 31, and output a position signal representing the electric angle θ of the rotor. The position sensor 500 may be implemented as a Hall sensor, an encoder, a resolver, or the like.

The position sensor 500 may be electrically connected to the controller 100, and may provide a position signal corresponding to a rotational displacement of the rotor to the controller 100.

The controller 100 may be electrically connected to the driving assistance device 300, the accelerator pedal sensor 400, the driver 200, and/or the position sensor 500. The controller 100 may receive a warning signal for outputting a warning to the driver from the driving assistance device 300, receive an acceleration signal indicating a driver's acceleration command from the accelerator pedal sensor 400, and receive a position signal indicating the rotational displacement of the driving motor 31 from the position sensor 500. Furthermore, the controller 100 may provide a driving signal for controlling operation of the driving motor 31 to the driver 200.

The controller 100 may include a processor 101 that generates a control signal for controlling operation of the vehicle 1, and a memory 102 that stores or records a program and/or data for controlling operation of the vehicle 1.

The processor 101 and the memory 102 may be implemented as separate semiconductor devices or as a single semiconductor device. Furthermore, the controller 100 may include a plurality of processors or a plurality of memories.

The memory 102 may include a volatile memory such as a Static Random Access Memory (S-RAM) and a Dynamic Random Access Memory (D-RAM), and a non-volatile memory such as a Read Only Memory (ROM), and an Erasable Programmable Read Only Memory (EPROM), or the like, and may store or record a program and/or data for processing a warning signal, an acceleration signal or a position signal.

The processor 101 may include a microprocessor, a microcontroller, an application specific integrated circuit (ASIC), or a field programmable gate array (FPGA).

The processor 101 may include a single processor or a plurality of processors, and is configured to process the warning signal, the acceleration signal, or the position signal, and output the driving signal for controlling the operation of the driving motor 31 based on the processing of the signal.

The processor 101 may identify a target rotation speed of the driving motor 31 based on the acceleration signal received from the accelerator pedal sensor 400. The processor 101 may identify the measured rotation speed of the driving motor 31 based on the position signal received from the position sensor 500, and may provide a control signal to the driver 200 so that the measured rotation speed follows the target rotation speed.

The processor 101 may identify a change in the rotation speed of the driving motor 31 based on the warning signal received from the driving assistance device 300. In other words, the processor 101 may identify vibration or fluctuation in the rotation speed of the driving motor 31 for generating a vibration which may be detected by the driver. The processor 101 may provide a control signal for vibrating the rotation speed of the driving motor 31 to the driver 200.

The processor 101 may control the driver 200 to generate vibrations including various predetermined patterns, sizes, and frequencies according to the received warning signal. For example, the processor 101 may control the driver 200 so that a pattern or frequency of vibration for warning of a forward collision is different from a pattern or frequency of vibration for warning of a rear collision (or lateral collision). For example, the processor 101 may control the driver 200 so that a magnitude of the vibration for warning that a time remaining until the forward collision is less than a first time is different from a magnitude of the vibration for warning that the time remaining until the forward collision is smaller than a second time, which is less than the first time.

Accordingly, the controller 100 may control the rotation speed of the driving motor 31 in response to a driver's intention to accelerate (acceleration signal), and add vibrate to the rotation speed of the driving motor 31 to provide a warning to the driver.

Figure 3:
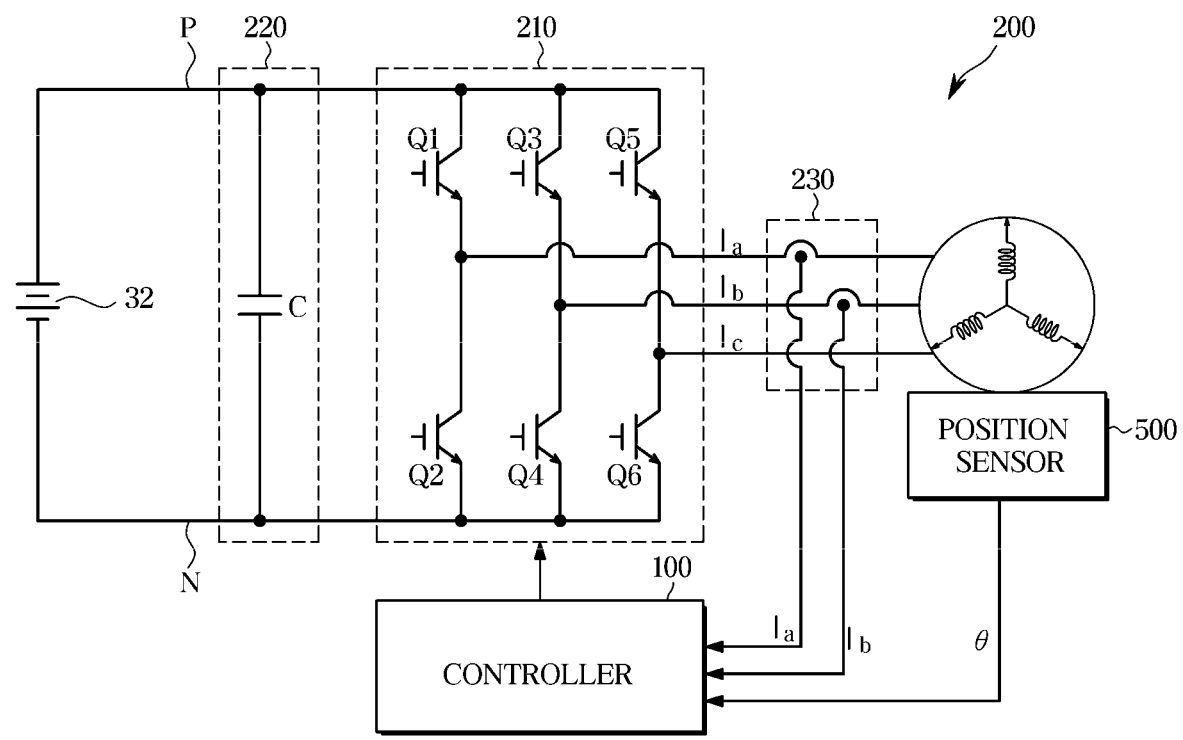
FIG. 3 shows a configuration of a driving unit of a vehicle according to an exemplary embodiment of the present disclosure.

FIG. 3 shows a configuration of a driver of a vehicle according to an exemplary embodiment of the present disclosure.

Referring to FIG. 3, the driver 200 may include a DC link circuit 220 that removes ripple of the rectified power and outputs DC power, the inverter 210 that converts DC power into sinusoidal driving power and outputs a driving current Iabc to the driving motor 31, and a current sensor 230 for measuring the driving current Iabc supplied to the driving motor 31.

The DC link circuit 220 includes a DC link capacitor C for storing electrical energy. The DC link capacitor C is provided between a positive terminal P and a negative terminal N of the driver 200. The DC link circuit 220 may receive DC power from the battery 32 and output DC power.

The inverter 210 may include three switching element pairs Q1 and Q2, Q3 and Q4, and Q5 and Q6 provided between the positive terminal P and the negative terminal P of the driver 200. The switching element pairs Q1 and Q2, Q3 and Q4, Q5 and Q6 may include two switching elements Q1 and Q2, Q3 and Q4, Q5 and Q6 connected in series with each other, respectively. The switching elements Q1, Q2, Q3, Q4, Q5, and Q6 included in the inverter 210 are turned ON/OFF according to the output of the controller 100, respectively, and the three-phase driving current Iabc may be supplied to the driving motor 31 according to the turn ON/OFF of the switching elements Q1, Q2, Q3, Q4, Q5, and Q6.

The current sensor 230 may measure the three-phase driving current (a-phase current, b-phase current, and c-phase current) output from the inverter 210, and output current signals representing the measured three-phase driving current values Ia, Ib, and Ic (Iabc) to the controller 100. Furthermore, the current sensor 230 may measure only two-phase driving currents among the three-phase driving currents Iabc, and the controller 100 may predict the other driving current from the two-phase driving currents.

Figure 4:
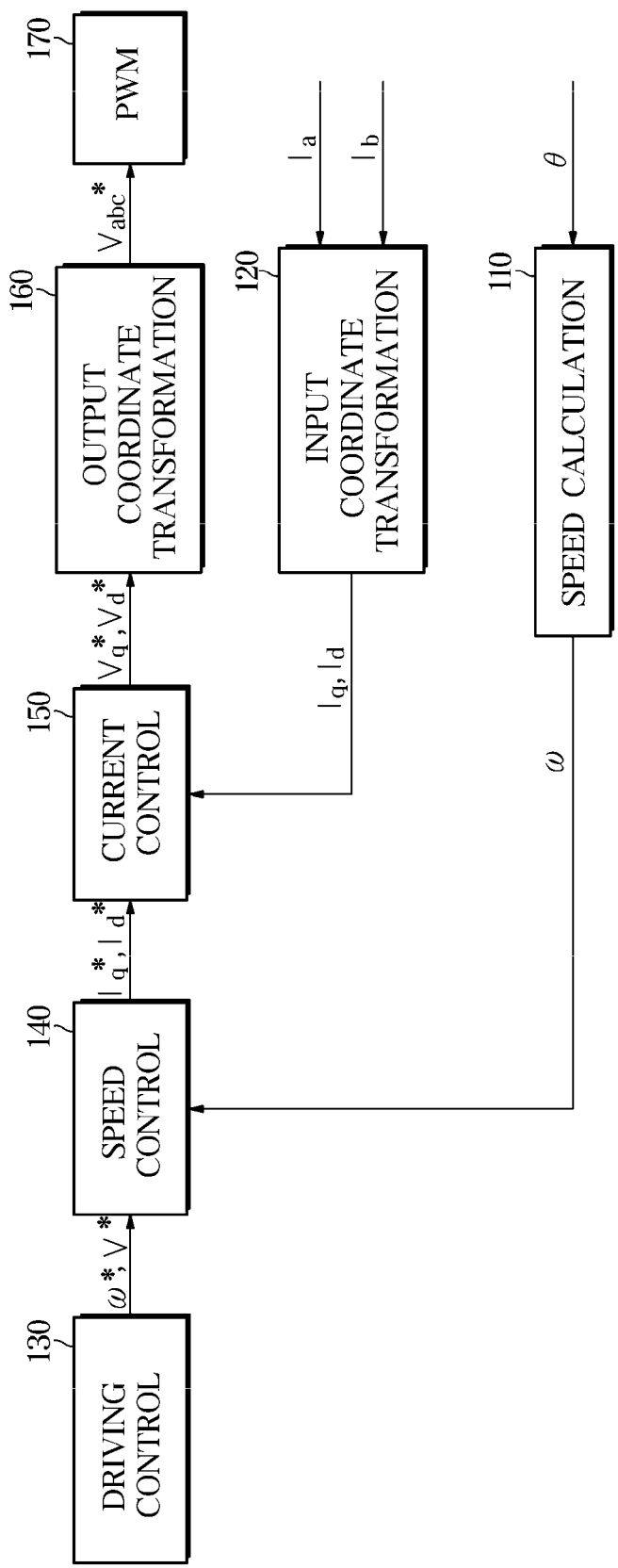
FIG. 4 shows a configuration of a control unit of a vehicle according to an exemplary embodiment of the present disclosure.

FIG. 4 shows a configuration of the controller of a vehicle according to an exemplary embodiment of the present disclosure.

Referring to FIG. 4, the controller 100 may include a speed calculation 110, an input coordinate transformation 120, a driving control 130, a speed control 140, a current control 150, an output coordinate transformation 160, and a pulse width modulation 170. Each of the speed calculation 110, the input coordinate transformation 120, the speed control 140, the current control 150, the output coordinate transformation 160, and the pulse width modulation 170 may be implemented as software stored in the memory 102 or implemented as hardware within the processor 101.

The speed calculation 110 may identify the rotor electric angle θ of the driving motor 31 based on the position signal of the position sensor 500, and determine a rotation speed value ω of the driving motor 31 based on the rotor electric angle θ of the driving motor 31. For example, the speed calculation 110 may determine the rotation speed value ω of the driving motor 31 based on a change amount of the rotor electric angle θ with respect to a sampling time interval.

When the position sensor 500 is not provided, the speed calculation 110 may determine the rotation speed value ω of the driving motor 31 based on the driving current value Iabc measured by the current sensor 230.

The input coordinate transformation 120 may convert the three-phase driving current value Iabc into a d-axis current value Id and a q-axis current value Iq (hereinafter referred to as d-axis current and q-axis current) based on the rotor electrical angle θ. In other words, the input coordinate transformation 120 may perform axial transformation of the a-axis, b-axis, and c-axis of the three-phase driving current value Iabc into the d-axis and the q-axis. Here, the d-axis represents a radial direction of the rotor of the driving motor 31, and the q-axis represents a rotation direction (i.e., a circumferential direction) of the rotor of the driving motor 31. Furthermore, the d-axis current may represent a current component in the d-axis direction among the driving current, and the q-axis current may represent a current component in the q-axis direction among the driving current.

The input coordinate transformation 120 may determine the q-axis current value Iq and the d-axis current value Id from the three-phase driving current value Iabc using [Equation 1].

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} 1 & -1/2 & -1/2 \\ 0 & 1/\sqrt{3} & -1/\sqrt{3} \end{bmatrix} \begin{bmatrix} I_a \\ I_b \\ I_c \end{bmatrix}. \quad \text{[Equation 1]}$$

(Here, Id is the d-axis current value, Iq is the q-axis current value, θ is the electric angle of the rotor, Ia is the a-phase current value, Ib is the b-phase current value, and Ic is the c-phase current value.)

The driving control 130 may output a rotation speed command ω* and a vibration command v* based on the acceleration signal and/or the warning signal. For example, the driving control 130 may output the rotation speed command ω* based on the acceleration signal and output the vibration command v* based on the warning signal.

The speed control 140 may output a q-axis current command Iq* and a d-axis current command Id* based on the rotation speed command ω* and the vibration command v*.

The speed control 140 may compare the rotation speed command ω* of the controller 100 with the rotation speed value ω of the driving motor 31, and output the q-axis current command Iq* based on the comparison result. For example, the speed control 140 may, using a proportional integral (PI) control, determine the q-axis current command Iq* to be supplied to the driving motor 31 based on the difference between the rotation speed command ω* and the rotation speed value ω.

The speed control 140 may output the d-axis current command Id* so that the rotation speed of the driving motor 31 is changed according to the vibration command v*.

The current control 150 may compare the q-axis current command Iq* and the d-axis current command Id* output from the speed control 140 with the q-axis current value Iq and d-axis current value Id output from the input coordinate transformation 120, and output a q-axis voltage command Vq* and a d-axis voltage command Vd* based on the comparison result. The current control 150 may, using the PI control, determine the q-axis voltage command Vq* based on the difference between the q-axis current command Iq* and the q-axis current value Iq and determine the d-axis voltage command Vd* based on the difference between the d-axis current command Id* and the d-axis current value Id.

The output coordinate transformation 160 may convert a dq-axis voltage command Vdq* into a three-phase voltage command Vabc* (i.e., a-phase voltage command, b-phase voltage command, c-phase voltage command) based on the rotor electrical angle θ of the driving motor 31.

The output coordinate transformation 160 may convert the dq-axis voltage command Vdq* into the three-phase voltage command Vabc* using [Equation 2].

$$\begin{bmatrix} V_a \\ V_b \\ V_c \end{bmatrix} = \begin{bmatrix} 1 & 0 \\ -1/2 & \sqrt{3}/2 \\ -1/2 & -\sqrt{3}/2 \end{bmatrix} \begin{bmatrix} \cos\theta & -\sin\theta \\ \sin\theta & \cos\theta \end{bmatrix} \begin{bmatrix} V_d \\ V_q \end{bmatrix}. \quad \text{[Equation 2]}$$

(Here, Va is the a-phase voltage command, Vb is the b-phase voltage command, Vc is the c-phase voltage command, θ is the rotor electric angle, Vd is the d-axis voltage command, and Vq is the q-axis voltage command.)

The pulse width modulation 170 may output a pulse width modulation (PWM) control signal Vpwm for turning on or off the switching circuits Q1, Q2, Q3, Q4, Q5, and Q6 of the inverter circuit 230 from the three-phase voltage command Vabc*. The pulse width modulation 170 may perform the PWM with respect to the three-phase voltage command Vabc*, and output the performed PWM signal Vpwm to the driver 200.

Figure 5:
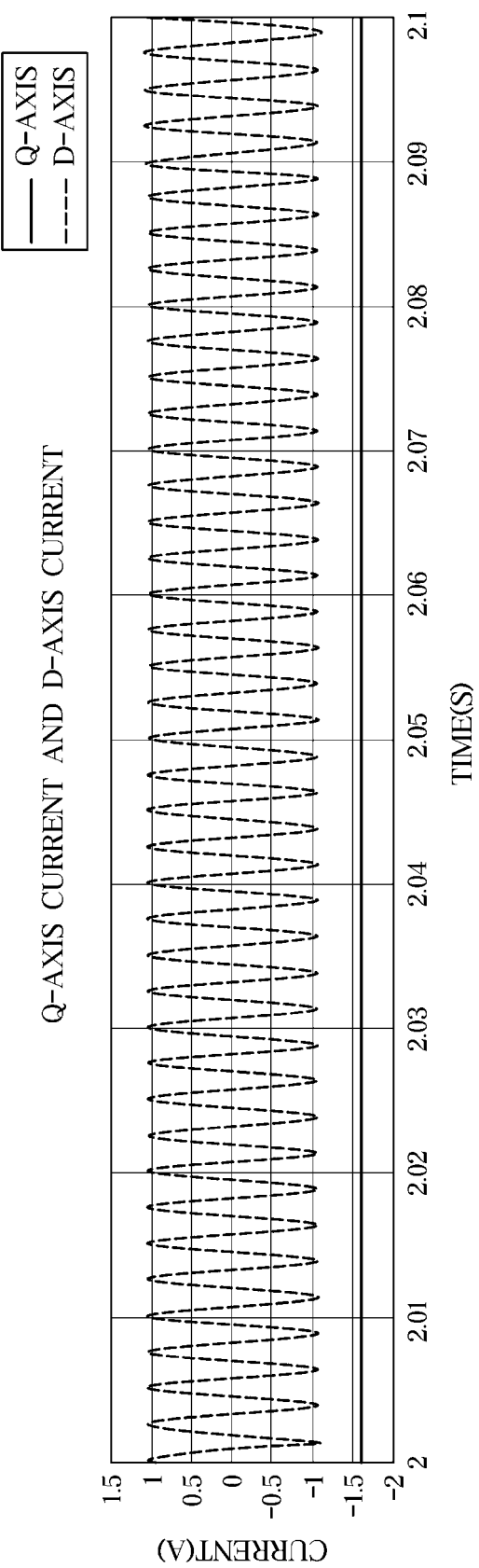
FIG. 5 shows an example of a q-axis current and a d-axis current of a vehicle according to an exemplary embodiment of the present disclosure.
Figure 6:
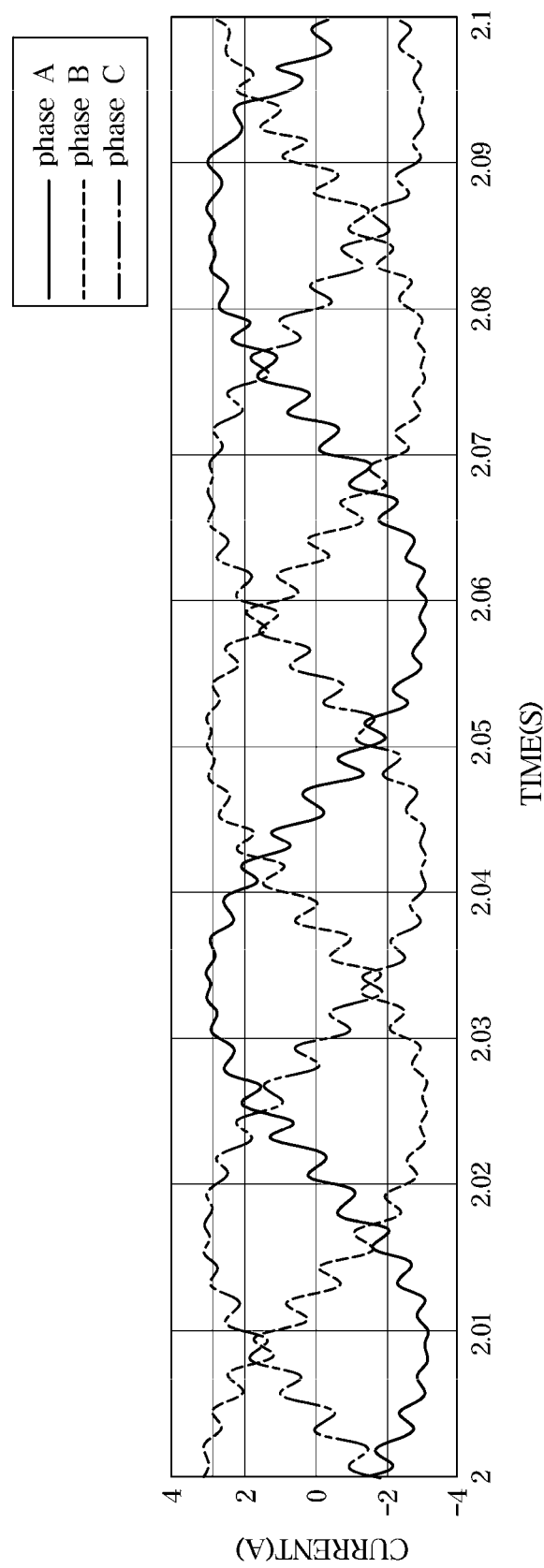
FIG. 6 shows an example of a phase current of the driving motor by the q-axis current and the d-axis current shown in FIG. 5.

FIG. 5 shows an example of a q-axis current and a d-axis current of a vehicle according to an exemplary embodiment of the present disclosure. FIG. 6 shows an example of the phase current of the driving motor by the q-axis current and the d-axis current shown in FIG. 5.

When the vehicle 1 travels at a constant driving speed on a consistent road surface, a load of a constant magnitude (e.g., rolling friction force between a wheel and a road surface) is applied to the driving motor 31 and the driving motor 31 may rotate at a constant speed.

When a load of a constant magnitude is applied to the driving motor 31 and the driving motor 31 rotates at a constant speed, the q-axis current may indicate a constant value. In other words, the driving control 130 may output the rotation speed command ω* of a constant magnitude so that the driving motor 31 rotates at a constant speed, and the speed control 140 may output the q-axis current command Iq* of a constant magnitude as shown in FIG. 5.

When the warning signal is received from the driving assistance device 300, the controller 100 may control the driver 200 to change the rotation speed of the driving motor 31. In other words, the driving control 130 may output the vibration command v* based on the warning signal, and the speed control 140 may output the d-axis current command Id* that changes over time as shown in FIG. 5. For example, the speed control 140 may output the d-axis current command Id* that changes in a form of a sine wave.

By the constant magnitude of the q-axis current command Iq* and the sinusoidal d-axis current command Id*, phase current Iabc in a form of a sine wave including ripple may be supplied to the driving motor 31 as shown in FIG. 6.

For example, the phase current of A-phase in a form of a sine wave may flow through the A-phase terminal, and the phase current of B-phase with a phase delayed by 120 degrees from the phase current of A-phase may flow through the B-phase terminal. Furthermore, the phase current of C-phase delayed by 120 degrees from the phase current of B-phase may flow through the C-phase terminal.

Furthermore, due to the periodically changing d-axis current, an approximately sinusoidal ripple may be added to the phase current of A-phase, the phase current of B-phase current, and the phase current of C-phase.

Accordingly, the driving current supplied to the driving motor 31 may include a first driving current in a form of sine wave, and a second driving current in a form of sine wave including a frequency greater than that of the first driving current and an amplitude smaller than that of the first driving current (ripple shown in FIG. 6).

The driving motor 31 may generate a rotational torque by the first driving current. In other words, the vehicle 1 may travel by the first driving current.

The driving motor 31 may generate a vibration by the second driving current. In other words, the frame 10 of the vehicle 1 may vibrate by the second driving current, and the vibration of the frame 10 may be transmitted to the driver and awaken the driver.

Figure 7:
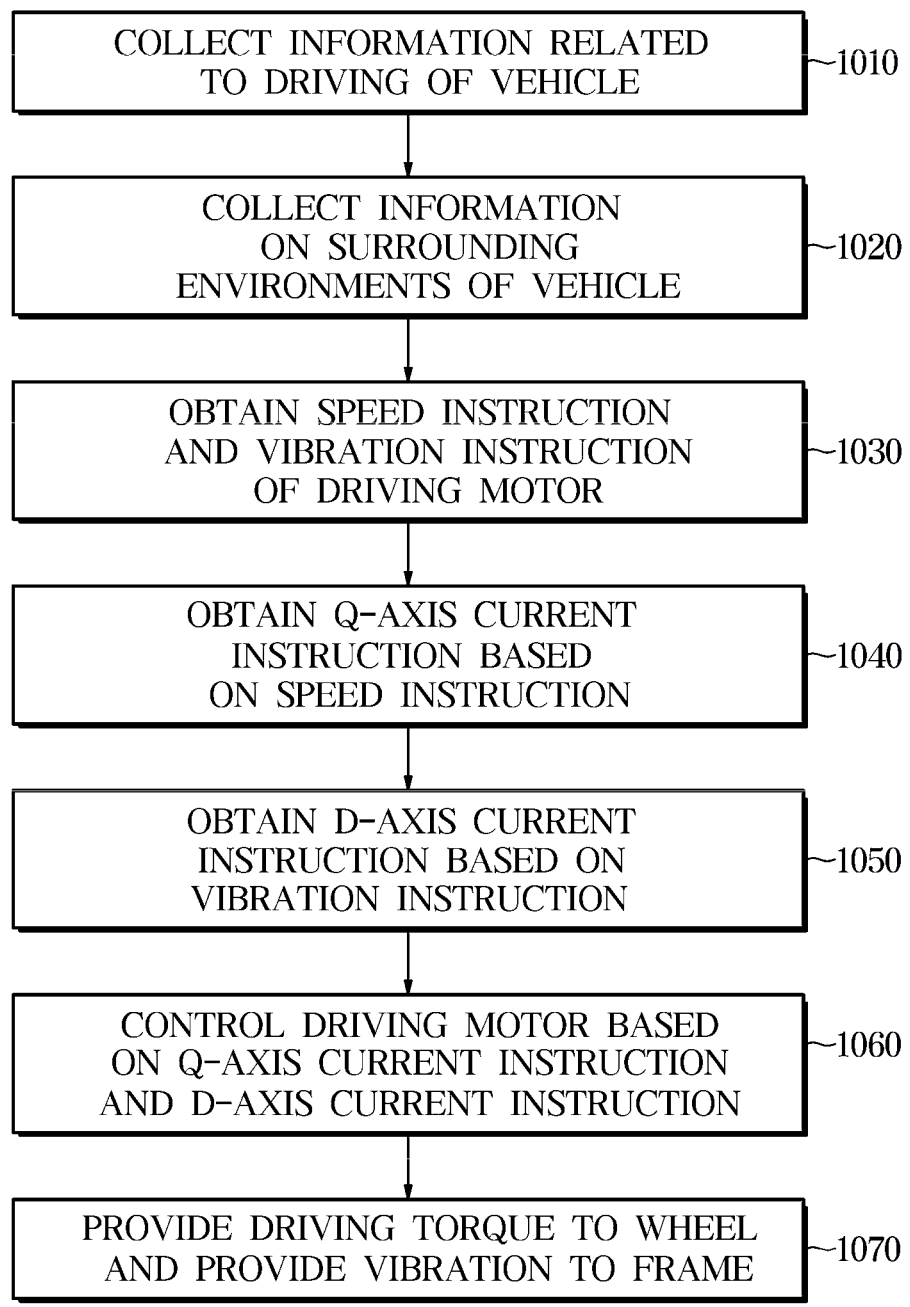
FIG. 7 shows a method for controlling a vehicle according to an exemplary embodiment of the present disclosure.

FIG. 7 shows a method for controlling a vehicle according to an exemplary embodiment of the present disclosure.

A method for controlling the vehicle will be described with reference to FIG. 7.

The vehicle 1 may collect information related to driving of the vehicle 1 (1010).

The accelerator pedal sensor 400 may detect the movement displacement and movement speed of the accelerator pedal by the driver's intention to accelerate or drive. The accelerator pedal sensor 400 may output the acceleration signal indicating the movement displacement and movement speed of the accelerator pedal.

The vehicle 1 may collect information on surrounding environments of the vehicle 1 (1020).

The driving assistance device 300 may collect environmental information around the vehicle 1. For example, the driving assistance device 300 may identify other vehicles around the vehicle 1, pedestrians around the vehicle 1, and/or stationary objects that interfere with the driving of the vehicle 1.

The driving assistance device 300 may output the warning signal for providing a warning to the driver based on the environmental information around the vehicle 1.

The vehicle 1 may obtain the speed command and the vibration command of the driving motor 31 that drives the vehicle 1 (1030).

The controller 100 may obtain the rotation speed command ω* and the vibration command v* of the driving motor 31 based on the acceleration signal of the accelerator pedal sensor 400 and the warning signal of the driving assistance device 300.

The vehicle 1 may obtain the q-axis current command based on the speed command (1040).

The controller 100 may determine the q-axis current command Iq* so that the measured rotation speed follows the rotation speed command ω* based on the comparison between the rotation speed command ω* and the measured rotation speed of the driving motor 31.

The vehicle 1 may obtain the d-axis current command based on the vibration command (1050).

The controller 100 may determine the d-axis current command Id* so that the rotation speed of the driving motor 31 is changed according to the vibration command v*.

The vehicle 1 may control the driving motor 31 according to the q-axis current command and the d-axis current command (1060).

The controller 100 may provide the PWM signal to the inverter 210 based on the q-axis current command Iq* and the d-axis current command Id*.

The inverter 210 may supply the driving current to the driving motor 31 according to the PWM signal. The driving current may overlap the first driving current and the second driving current in a form of a sine wave. The first driving current may be supplied to the driving motor 31 according to the q-axis current command Iq*. The second driving current may be supplied to the driving motor 31 according to the d-axis current command Id*. The first driving current and the second driving current may have a sinusoidal wave shape, and the frequency of the second driving current may be greater than that of the first driving current. Furthermore, the amplitude of the second driving current may be greater than that of the first driving current.

The driving torque may be provided to the wheel 20 by the rotation of the driving motor 31, and the vibration may be provided to the frame 10 (1070).

The driving motor 31 may generate the rotational torque by the first driving current. In other words, the vehicle 1 may travel by the first driving current.

The driving motor 31 may generate the vibration by the second driving current. In other words, the frame 10 of the vehicle 1 may vibrate by the second driving current, and the vibration of the frame 10 may be transmitted to the driver and wake the driver.

As is apparent from the above, various embodiments of the present disclosure may provide a vehicle configured for generating vibration using the driving motor that drives the vehicle without a separate device for generating vibration. Accordingly, the vehicle may provide the warning through the vibration to the driver without an increase in weight and without a decrease in energy efficiency (or fuel economy).

On the other hand, the above-described embodiments may be implemented in a form of a recording medium storing commands executable by a computer. The commands may be stored in a form of program code. When the commands are executed by a processor, a program module is generated by the commands so that the operations of the disclosed exemplary embodiments of the present disclosure may be conducted. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
   a driving motor for driving the vehicle;
   a driver electrically connected to the driving motor; and
   a controller electrically connected to the driver;
   wherein the controller is configured to control the driver to supply a driving current to the driving motor,
   wherein the driving current includes a first driving current and a second driving current,
   wherein the driving motor is configured to receive the first driving current and control a driving speed of the vehicle,
   wherein the driving motor is configured to receive the second driving current and generate vibration in the vehicle, and
   wherein the controller is configured to determine a d-axis current value calculated based on a three-phase driving current of the driving motor and an electrical angle of a rotor provided in the driving motor, and control the vibration of the vehicle using the determined d-axis current value.

2. The vehicle of claim 1, further including an accelerator pedal sensor connected to the controller,
   wherein the controller is further configured to control the driver to supply the first driving current to the driving motor based on an acceleration signal received from the accelerator pedal sensor.

3. The vehicle of claim 2, wherein the controller is further configured to control the driver to supply the first driving current to the driving motor so that a rotation speed of the driving motor follows a target rotation speed based on the acceleration signal.

4. The vehicle of claim 1, further including a driving assistance device connected to the controller,
   wherein the controller is further configured to control the driver to supply the second driving current to the driving motor based on a warning signal received from the driving assistance device.

5. The vehicle of claim 4, wherein the controller is further configured to control the driver to supply different second driving currents to the driving motor so that the vehicle vibrates in different patterns based on different warning signals received from the driving assistance device.

6. The vehicle of claim 4, wherein the controller is further configured to control the driver to supply different second driving currents to the driving motor so that the vehicle vibrates with different amplitudes based on different warning signals received from the driving assistance device.

7. The vehicle of claim 4, wherein the controller is further configured to control the driver to supply different second driving currents to the driving motor so that the vehicle vibrates at different frequencies based on different warning signals received from the driving assistance device.

8. The vehicle of claim 4, wherein the driving assistance device is configured to provide a warning signal for warning of a collision of the vehicle, to the controller.

9. The vehicle of claim 4, wherein the driving assistance device is configured to provide a warning signal for waking a driver, to the controller.

10. The vehicle of claim 1, wherein the controller is further configured to control the driver to supply the driving current based on a q-axis current command for controlling a rotation speed of the driving motor and a d-axis current command for changing the rotation speed of the driving motor, to the driving motor.

11. A method for controlling a vehicle including a driving motor, the method comprising:
    obtaining driving information of the vehicle including the driving motor for driving the vehicle;
    obtaining environmental information around the vehicle; and
    supplying, by a controller, a driving current to the driving motor,
    wherein the supplying the driving current to the driving motor includes:
      supplying, by the controller, a first driving current included in the driving current to the driving motor,
      receiving, by the driving motor, the first driving current and controlling a driving speed of the vehicle, and
      supplying, by the controller, a second driving current included in the driving current to the driving motor, and
      receiving, by the driving motor, the second driving current and generating vibration in the vehicle,
    wherein the supplying of the second driving current to the driving motor includes:
      determining, as the second current value, a d-axis current value calculated based on a three-phase driving current of the driving motor and an electrical angle of a rotor provided in the driving motor, and
      supplying a control signal for the vibration of the vehicle using the determined d-axis current value to the driving motor.

12. The method of claim 11, wherein the obtaining of the driving information of the vehicle includes:
    obtaining, by an accelerator pedal sensor of the vehicle, an acceleration signal including a movement displacement and a movement speed of an accelerator pedal.

13. The method of claim 12, wherein the supplying of the driving current to the driving motor includes:
    controlling, by the controller, the first driving current so that a rotation speed of the driving motor follows a target rotation speed based on the acceleration signal.

14. The method of claim 11, wherein the obtaining of the environmental information around the vehicle includes:
    obtaining, by a driving assistance device of the vehicle, information on an object around the vehicle, and
    obtaining a warning signal based on the information on the object.

15. The method of claim 14, wherein the supplying of the driving current to the driving motor includes:
    supplying, by the controller, different second driving currents to the driving motor so that the vehicle vibrates in different patterns based on different warning signals.

16. The method of claim 14, wherein the supplying of the driving current to the driving motor includes:

supplying, by the controller, different second driving currents to the driving motor so that the vehicle vibrates with different amplitudes based on different warning signals.

17. The method of claim 14, wherein the supplying of the driving current to the driving motor includes:
supplying, by the controller, different second driving currents to the driving motor so that the vehicle vibrates at different frequencies based on different warning signals.

18. The method of claim 14, wherein the obtaining of the environmental information around the vehicle includes:
obtaining a warning signal for warning of a collision of the vehicle.

19. The method of claim 14, wherein the obtaining of the environmental information around the vehicle includes:
obtaining a warning signal for waking up a driver.

20. The method of claim 11, wherein the supplying of the driving current to the driving motor includes:
supplying, by the controller, the driving current to the driving motor based on a q-axis current command for controlling a rotation speed of the driving motor and a d-axis current command for changing the rotation speed of the driving motor.

* * * * *